United States Patent
Doom et al.

(10) Patent No.: US 7,708,328 B2
(45) Date of Patent: May 4, 2010

(54) DEVICE HOLDER AND STORAGE DRAWER

(75) Inventors: Troy Doom, Ann Arbor, MI (US);
Akihiro Deshimaru, Ann Arbor, MI (US); Lauren Michelle Marzolf, Superior Township, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 382 days.

(21) Appl. No.: 11/865,178

(22) Filed: Oct. 1, 2007

(65) Prior Publication Data
US 2009/0085366 A1 Apr. 2, 2009

(51) Int. Cl.
*A47B 88/06* (2006.01)
*B60R 7/06* (2006.01)

(52) U.S. Cl. .................... 296/37.12; 206/565; 224/281; 312/348.4

(58) Field of Classification Search ................ 206/557, 206/561, 562, 563, 564, 565; 224/281, 483, 224/485, 929; 296/37.8, 37.12; 312/322, 312/323, 325, 326, 327, 328, 329, 330.1, 312/348.4
See application file for complete search history.

(56) References Cited

U.S. PATENT DOCUMENTS

| | | | | |
|---|---|---|---|---|
| 1,788,328 A | * | 1/1931 | Roberts | 312/348.4 |
| 1,851,855 A | * | 3/1932 | Lindemann et al. | 126/340 |
| 2,275,060 A | * | 3/1942 | Griffin | 312/334.27 |
| 2,301,730 A | * | 11/1942 | Mann | 312/293.2 |
| 2,382,011 A | * | 8/1945 | Howard | 312/303 |

(Continued)

FOREIGN PATENT DOCUMENTS

JP 04011537 A * 1/1992

(Continued)

*Primary Examiner*—Glenn Dayoan
*Assistant Examiner*—Paul A Chenevert
(74) *Attorney, Agent, or Firm*—Gifford, Krass, Sprinkle, Anderson & Citkowski, P.C.

(57) ABSTRACT

A device holder and storage compartment for use in a motor vehicle. The device holder and storage compartment are in the form of a slidable drawer that is concealed within a dashboard when in a closed position and extended from the dashboard when in an open position. The drawer has a generally horizontal bottom surface, a front end wall, a back end wall oppositely disposed from the front end wall, a first side wall and a second side wall adjoining the front end wall and the back end wall. All the walls are generally vertical in orientation. The drawer also has a generally vertical dividing wall spaced apart from the front end wall. The dividing wall defines a front region between the dividing wall and the front end wall and a rear region between the dividing wall and the back end wall. A front cover can be moveably attached to the drawer proximate the front end wall and move between a closed position and an open position. When in the closed position, the front cover is generally vertical and adjacent to the front end wall. In the open position, the front cover is spaced apart from the front end wall and affords viewing of a front surface of a device held in the front device holder region of the drawer. The front end wall of the drawer can have a cut-away portion which allows viewing of a bottom portion of the front display of the device.

14 Claims, 2 Drawing Sheets

U.S. PATENT DOCUMENTS

| | | | |
|---|---|---|---|
| 2,522,602 A * | 9/1950 | Burns | 281/12 |
| 2,564,673 A * | 8/1951 | Chauvin | 312/184 |
| 2,648,585 A * | 8/1953 | Straubel | 312/303 |
| 2,669,994 A * | 2/1954 | Straubel | 220/558 |
| 2,819,141 A * | 1/1958 | Myer | 312/303 |
| 3,337,282 A * | 8/1967 | Groff et al. | 312/245 |
| 3,554,429 A * | 1/1971 | Cohen | 229/120.34 |
| 4,577,773 A * | 3/1986 | Bitel | 220/533 |
| 4,595,098 A * | 6/1986 | Kryter | 206/387.14 |
| 4,709,972 A * | 12/1987 | LaBudde et al. | 312/208.3 |
| 5,207,471 A * | 5/1993 | Mutschler et al. | 296/37.12 |
| 5,265,729 A * | 11/1993 | Carlin | 206/561 |
| 5,285,938 A * | 2/1994 | Fauchald | 224/482 |
| 5,297,767 A | 3/1994 | Miller et al. | |
| 5,460,309 A * | 10/1995 | Nehl et al. | 224/281 |
| 5,529,271 A | 6/1996 | Dunchock | |
| 5,660,311 A | 8/1997 | Soltau | |
| 5,745,565 A | 4/1998 | Wakefield | |
| 5,839,710 A | 11/1998 | Hubbard | |
| 5,996,866 A | 12/1999 | Susko et al. | |
| 6,231,099 B1 * | 5/2001 | Greenwald | 296/37.8 |
| 6,450,468 B1 | 9/2002 | Hamamoto et al. | |
| 6,491,194 B2 | 12/2002 | Marvin | |
| 6,616,205 B2 | 9/2003 | Bruhnke et al. | |
| 6,692,053 B1 * | 2/2004 | Smith | 296/37.1 |
| 6,726,267 B2 * | 4/2004 | Kim et al. | 296/24.34 |
| 6,755,455 B2 * | 6/2004 | Choi | 296/37.12 |
| 6,808,097 B2 | 10/2004 | Kim et al. | |
| 6,851,736 B1 * | 2/2005 | Klopp et al. | 296/37.8 |
| 6,854,779 B2 | 2/2005 | Gehring et al. | |
| 6,908,135 B2 * | 6/2005 | Stahmer et al. | 296/37.8 |
| 6,942,267 B1 * | 9/2005 | Sturt | 296/24.34 |
| 6,957,755 B2 * | 10/2005 | Mahoney et al. | 224/413 |
| 7,103,397 B2 | 9/2006 | Oh et al. | |
| 7,413,229 B2 * | 8/2008 | Kukucka et al. | 296/24.34 |
| 2005/0000991 A1 | 1/2005 | Kogami | |
| 2005/0018392 A1 * | 1/2005 | Strohmeier et al. | 361/683 |
| 2006/0049731 A1 * | 3/2006 | Choi et al. | 312/330.1 |
| 2006/0197353 A1 | 9/2006 | Hanzel et al. | |
| 2006/0237612 A1 | 10/2006 | Thomas | |
| 2008/0174136 A1 * | 7/2008 | Welschholz et al. | 296/37.12 |

FOREIGN PATENT DOCUMENTS

| | | | |
|---|---|---|---|
| JP | 04090939 A | * | 3/1992 |
| JP | 06064484 A | * | 3/1994 |
| JP | 06144118 A | * | 5/1994 |
| JP | 06211086 A | * | 8/1994 |

* cited by examiner

DEVICE HOLDER AND STORAGE DRAWER

FIELD OF THE INVENTION

This invention relates generally to a device holder. More specifically, the invention relates to a device holder and storage compartment within a drawer.

BACKGROUND OF THE INVENTION

The use of storage compartments within motor vehicles can take the form of a glove compartment, also known as a glove box, in-dashboard recesses and compartments within consoles. Although a glove compartment provides a convenient area to store items out of sight, access to the items can be difficult to reach by a driver or back seat occupant of the motor vehicle. In addition, although in-dashboard recesses and compartments within consoles can provide storage spaces and areas for which devices can be held, they typically do not allow for convenient viewing of a device while the motor vehicle is in operation. As such, there is a need for a device holder and storage compartment that can be used during the operation of a motor vehicle and placed out of sight when the device holder is not needed.

SUMMARY OF THE INVENTION

Disclosed is a device holder and storage compartment for use in a motor vehicle. The device holder and storage compartment are in the form of a slidable drawer that is concealed within a dashboard when in a closed position and extended from the dashboard when in an open position. The drawer has a generally horizontal bottom surface, a front end wall, a back end wall oppositely disposed from the front end wall, a first side wall and a second side wall adjoining the front end wall and the back end wall. All the walls are generally vertical in orientation. The drawer also has a generally vertical dividing wall spaced apart from the front end wall. The dividing wall defines a front region between the dividing wall and the front end wall and a rear region between the dividing wall and the back end wall. A front cover can be moveably attached to the drawer proximate the front end wall and move between a closed position and an open position. When in the closed position, the front cover is generally vertical and adjacent to the front end wall. In the open position, the front cover is spaced apart from the front end wall and affords viewing of a front surface of a device held in the front device holder region of the drawer. The front end wall of the drawer can have a cut-away portion which allows viewing of a bottom portion of the front display of the device.

DETAILED DESCRIPTION OF THE PREFERRED EMBODIMENTS

The present invention includes a device holder and storage compartment in the form of a slidable drawer that fits within and extends out from a console or dashboard of a motor vehicle. As such, the present invention has utility as a device holder and/or a storage compartment.

The slidable drawer of the present invention has a dividing wall that separates the drawer into two compartments. A rear compartment serves as a storage region for items such as sunglasses, keys, coins, pens and pencils, jewelry and the like. A front compartment serves as a device holder for such devices as portable media players, personal digital assistants, cell phones and the like. The drawer can include a pivotable front cover which can pivot between a closed position wherein the drawer is concealed and an open position which allows for viewing of a front surface of a device being held in the front compartment.

Figure 1:
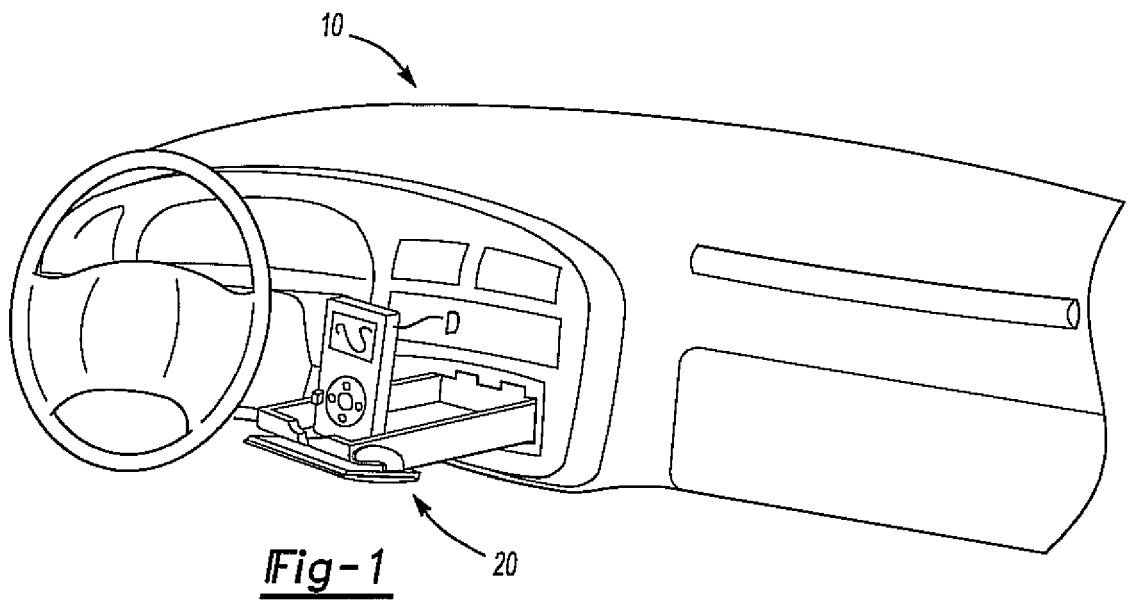
FIG. 1 is a perspective view of an embodiment of the present invention installed within a motor vehicle dash.
Figure 2:
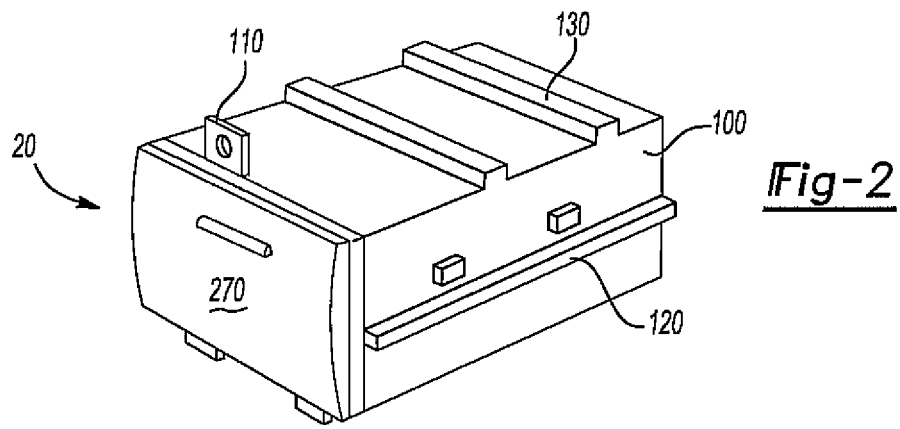
FIG. 2 is a perspective view of an embodiment of the present invention in a closed position.
Figure 3:
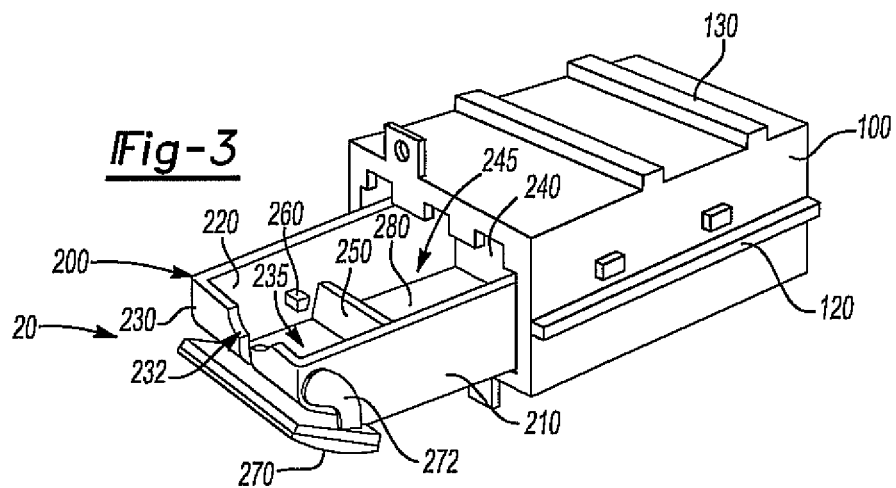
FIG. 3 is a perspective view of an embodiment of the present invention in an open position.

Referring now to FIG. 1, an embodiment of the present invention is shown generally at 10 wherein a drawer assembly 20 is extended from a dashboard of a motor vehicle. In FIGS. 2 and 3, the drawer assembly 20 is shown with a surrounding case 100. The surrounding case 100 can be used to mount the drawer assembly 20 into the dashboard. In some instances, the case 100 can include a guide rail 120 and support ridges 130. In addition, an attachment tab 110 can be used to attach the case 100 to the dashboard. At least partially within the case 100 is a slidable drawer 200. The slidable drawer 200 can include a first side wall 210 and a second side wall 220 that adjoins a front end wall 230 and a back end wall 240. Spaced apart from the front end wall 230 is a dividing wall 250 that separates the slidable drawer 200 into two regions. Attached to the generally vertical walls is a generally horizontal bottom surface 280.

Between the back end wall 240 and dividing wall 250 is a rear storage compartment 245 which affords for the storage of items such as sunglasses, coins, pens and pencils, jewelry and the like. Between the front end wall 230 and the dividing wall 250 is a front device holder region 235. The device holder region 235 affords for the placement and holding of devices D such as portable media players, personal digital assistants, cell phones and the like. In some instances, a tab 260 can be included within the front device holder region 235 to afford for the secure holding of the device. The tab 260 can be attached to one of the side walls 210 or 220, is located between the front end wall 230 and dividing wall 250, and is spaced apart from the dividing wall 250. In some instances, a pair of tabs 260 can be included wherein one tab is attached to the first side wall 210 and another tab is attached to the second side wall 220. The distance between the dividing wall 250 and the tab 260 is sufficient to afford for a device D to slide therebetween as illustrated in FIGS. 1 and 4.

Optionally included with the slidable drawer 200 can be a front cover 270. The front cover 270 can be moveably mounted to the slidable drawer 200 using any mechanism or means known to those skilled in the art, illustratively including a front cover hinge 272 as shown in FIG. 3. The hinge 272 affords for the front cover 270 to move from a closed position as shown in FIG. 2 to an open position as shown in FIG. 3. In the alternative, the front cover 270 can slide from a closed position to an open position. The closed position as shown in FIG. 2 affords for concealment of the slidable drawer 200 when the drawer is at least partially within the dashboard. In the open position as shown in FIG. 3, the front cover 270 slopes away from the front end wall 230 and affords for the viewing of a front surface on a device held within the device holder region 235. The slidable drawer 200 is afforded sliding movement within the case 100 using any mechanism known to those skilled in the art, illustratively including guide rails, ball bearings, slots and the like. In some instances, the slidable drawer 200 slides between the closed position and the open position by manual force applied by an occupant of the motor vehicle. In other instances, the slidable drawer 200 is a powered drawer and moves between the closed position and the open position using power supplied by the motor vehicle. Such power can be used to energize an electric motor, a pneumatic motor, a hydraulic system and the like.

Figure 4:
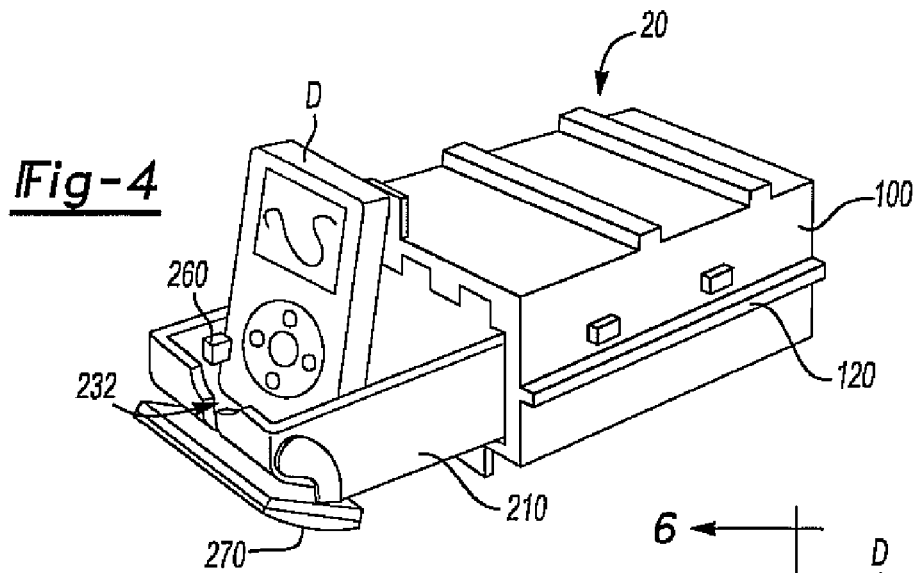
FIG. 4 is a perspective view of an embodiment of the present invention in an open position with a device being held in a device holder region.
Figure 5:
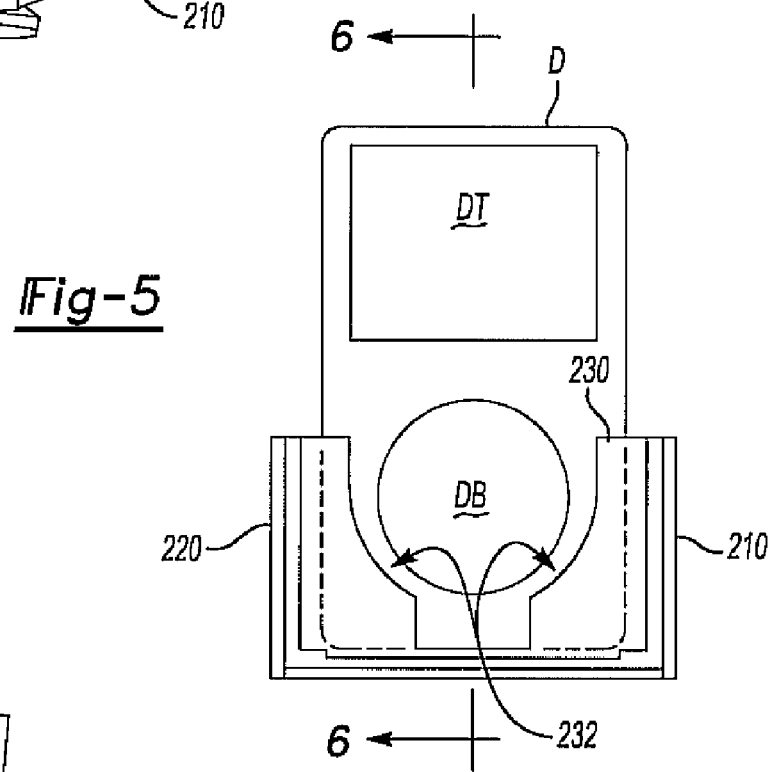
FIG. 5 is a front view of an embodiment of the present invention.
Figure 6:
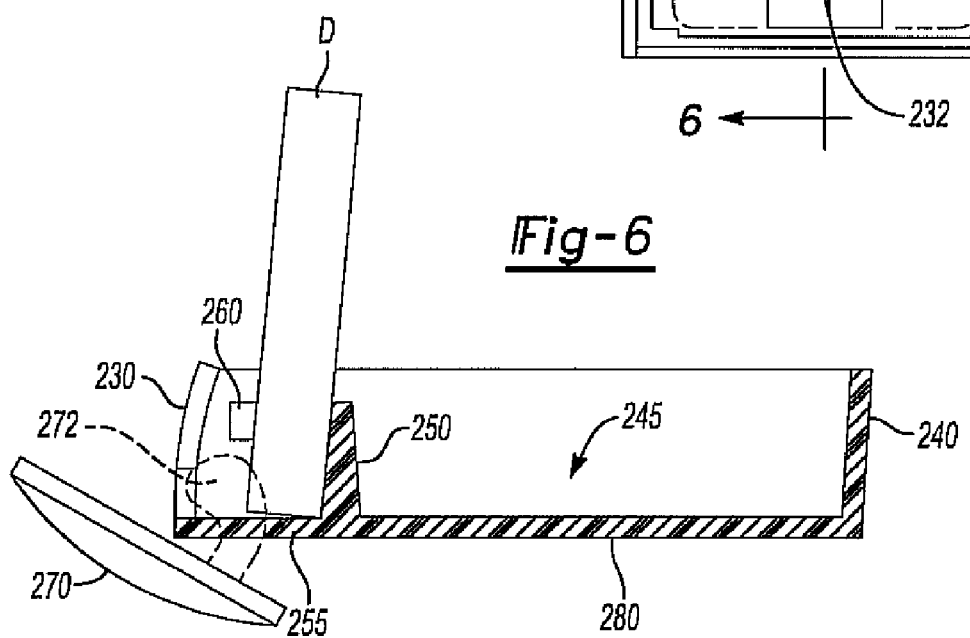
FIG. 6 is a side cross-sectional view of an embodiment of the present invention.

Turning now to FIGS. 4-6, an embodiment of the present invention is shown with a device D placed within and held by the front device holder region 235. The device D has a front display with a top portion DT and a bottom portion DB. As illustrated in FIG. 5, the front end wall 230 can have a cut-away region 232 that affords for the viewing of the bottom portion DB of the front surface display of device D. As illustrated in FIG. 6, the tab 260 and the dividing wall 250 define a device slot 255 which affords for the secure holding of the device D. In addition, FIG. 6 illustrates a side view of the rear storage region 245.

The case 100 and slidable drawer 200 can be made from any material known to those skilled in the art, illustratively including metals, alloys, ceramics, plastics and combinations thereof. Although the embodiments described above illustrate the use of the slidable drawer 200 with the case 100, the case 100 is not required in the present invention. The slidable drawer 200 can be movably attached directly to the dashboard of a motor vehicle so long as the slidable drawer 200 can move between a closed position wherein the drawer is at least partially within the dashboard and an open position wherein the drawer is at least partially extended from the dashboard. It is also appreciated that the term "motor vehicles" can include automobiles, trucks, boats and the like.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims including all equivalents which define the scope of the invention.

We claim:

1. A device holder and storage compartment for use in a motor vehicle comprising:
    a drawer having a generally horizontal bottom surface, a front member, a back end wall oppositely disposed from said front member, a first side wall and a second side wall adjoining said front member and said back end wall, said walls being generally vertical in orientation and said drawer operable to slide between a closed position at least partially within a dashboard and an open position at least partially extended from said dashboard;
    said drawer also having a generally vertical dividing wall spaced apart from said front member and defining a front region between said dividing wall and said front end wall and a rear region between said dividing wall and said back end wall; and
    a front cover moveably attached to said drawer proximate said front end wall and moveable between a closed position and an open position, said front cover generally vertical and adjacent to said front end wall of said drawer when in said closed position and spaced apart from said front end wall when in said open position; wherein said front member has a non-linear top edge;
    said open position of said front cover operable to allow viewing of a front surface of a device being held in said front region of said drawer.

2. The invention of claim 1, wherein said non-linear top edge of said front member has a cut-away portion operable to allow viewing of a front display on the front surface of the device being held in said front region of said drawer.

3. The invention of claim 2, wherein said cut-away portion is in the form of a semi-circle.

4. The invention of claim 2, wherein said cut-away portion is in the form of a square.

5. The invention of claim 2, wherein said cut-away portion is in the form of a rectangle.

6. The invention of claim 1, further comprising:
    a tab attached to one of said side walls between said front member and said dividing wall, said tab spaced apart from said dividing wall such that a device holding slot is defined therebetween.

7. The invention of claim 1, further comprising:
    a first tab attached to said first side wall;
    a holding tab attached to said second side wall;
    said tabs attached to said side walls between said front member and said dividing wall; and
    said tabs spaced apart from said dividing wall such that a device holding slot is defined therebetween.

8. A device holder and storage compartment for use in a motor vehicle comprising:
    a drawer having a generally horizontal bottom surface, a front member, a back end wall oppositely disposed from said front member, a first side wall and a second side wall adjoining said front member and said back end wall, said walls being generally vertical in orientation and said drawer operable to slide between a closed position at least partially within a dashboard in said motor vehicle and an open position at least partially extended from said dashboard;
    said drawer also having a generally vertical dividing wall spaced apart from said front member and defining a front region between said dividing wall and said front member and a rear region between said dividing wall and said back end wall;
    a tab attached to one of said side walls between said front member and said dividing wall, said tab spaced apart from said dividing wall such that a device holding slot is defined therebetween; and
    a front cover moveably attached to said drawer proximate said front member and moveable between a closed position and an open position, said front cover being generally vertical and adjacent to said front member of said drawer when in said closed position and spaced apart from said front member when in said open position;
    said open position of said front cover operable to allow viewing of a front surface of a device held in said device holding slot of said drawer and said closed position operable to prevent viewing of the front surface of the device held in said device holding slot.

9. The invention of claim 8, wherein said non-linear top edge of said front member has a cut-away portion operable to allow viewing of a front display on the front surface of the device being held in said front device holder region of said drawer.

10. The invention of claim 9, wherein said cut-away portion is in the form of a semi-circle.

11. The invention of claim 9, wherein said cut-away portion is in the form of a square.

12. The invention of claim 9, wherein said cut-away portion is in the form of a rectangle.

13. The invention of claim 8, wherein:

said tab is a first tab attached to said first side wall;

said invention further comprising:

a second tab attached to said second side wall;

said tabs attached to said side walls between said front member and said dividing wall, and spaced apart from said dividing wall such that said device holding slot is defined therebetween.

14. A device holder and storage compartment for use in a motor vehicle comprising:

a drawer having a generally horizontal bottom surface, a front member, a back end wall oppositely disposed from said front member, a first side wall and a second side wall adjoining said front member and said back end wall, said walls being generally vertical in orientation and said drawer operable to slide between a closed position at least partially within a dashboard in said motor vehicle and an open position at least partially extended from said dashboard;

said drawer also having a generally vertical dividing wall spaced apart from said front member and defining a front device holder region between said dividing wall and said front member and a rear storage region between said dividing wall and said back end wall;

a first holding tab attached to said first side wall and a second holding tab attached to said second side wall, said holding tabs attached to said side walls between said front member and said dividing wall and defining a device holding slot between said dividing wall and said holding tabs; and a front cover pivotally attached to said drawer proximate said front member and pivotable to move between a closed position and an open position, said front cover being generally vertical and adjacent to said front member of said drawer when in said closed position and generally sloped away from said front member when in said open position;

said open position of said front cover operable to allow viewing of a front surface of a device being held in said device holder region of said drawer and said closed position operable to prevent viewing of the front surface of the device being held in said device holder region.

* * * * *